Jan. 5, 1954     H. M. BUCKWALTER     2,665,230
PROTECTION OF TIRE CELLULOSE FIBER AGAINST HEAT AGING
Filed March 26, 1948
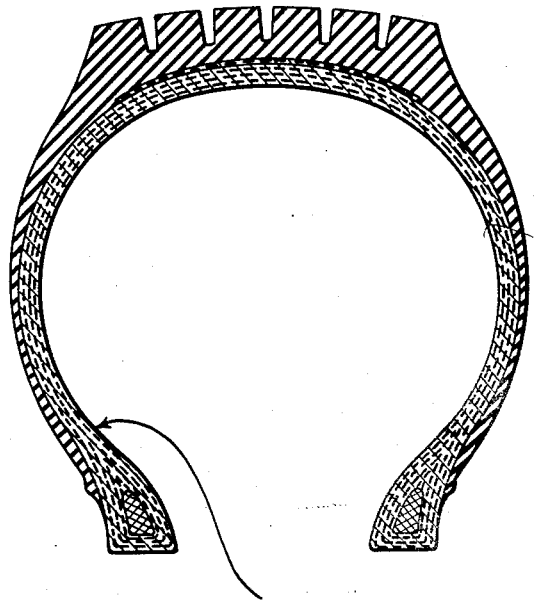
RAYON TIRE CORDS CONTAINING
A PRIMARY AMINE TO PREVENT
LONG-TERM GRADUAL HEAT-
DETERIORATION
INVENTOR.
HOWARD M. BUCKWALTER
BY *James J. Long*
AGENT Patented Jan. 5, 1954

2,665,230

UNITED STATES PATENT OFFICE 2,665,230

PROTECTION OF TIRE CELLULOSE FIBER AGAINST HEAT AGING

Howard M. Buckwalter, Detroit, Mich., assignor to United States Rubber Company, New York, N. Y., a corporation of New Jersey Application March 26, 1948, Serial No. 17,389

3 Claims. (Cl. 117—144)

This invention relates to the protection of cellulose fiber, especially regenerated cellulose fiber, against deterioration by heat aging and more particularly to the protection of the cellulose fiber reinforcement of vulcanized rubber articles (especially pneumatic rubber tires) against deterioration by heat aging.

Deterioration of cellulose fiber, especially regenerated cellulose fiber, upon subjection to elevated temperature for prolonged periods of time is a very serious problem in the art. This problem is encountered particularly in the case of rubber articles which are reinforced with cellulose fiber, almost invariably stranded and in the form of cords or fabric, which may be a woven fabric having warp and woof threads or a so-called "weftless fabric" or "web fabric" composed of parallel cords joined together by the dry deposit of rubber latex, as described for example in the patent to Hopkinson, No. 1,424,020. The deterioration under the action of heat is particularly evidenced by progressive reduction in tensile strength of the cellulose fiber.

The principal object of the present invention is to provide an improved method of protecting cellulose fiber, especially when stranded and in the form of a fabric, against deterioration by heat aging. Another object is to provide a method of protecting regenerated cellulose fiber against heat aging. Another object is to provide methods of protecting the cellulose fiber reinforcement of vulcanized rubber articles against deterioration by heat aging. Another object is to provide a method of protecting the cellulose fiber reinforcement of pneumatic rubber tires against heat aging. Another object is to provide a method of protecting the cellulose cord or fabric of pneumatic tires which method is adapted to be periodically employed while the tire is in service in such manner as to give protection against heat aging throughout the life of the tire if so desired. Another object is to protect the cellulose cord or fabric of pneumatic tires by the disposition of protective chemicals hereinafter disclosed within the tire in service as for example on the inside of the casing or on the outside of the inner tube or within the inner tube. Another object is to provide articles of manufacture embodying cellulose fibers protected against heat deterioration, such articles of manufacture including cellulose fibers themselves, whether unstranded, stranded or in the form of fabric, and vulcanized rubber articles reinforced with such cellulose fibers, such as pneumatic tire casings reinforced therewith. Many other objects of the present invention will more fully hereinafter appear.

I have now found that cellulose fiber, especially regenerated cellulose fibers, can be protected against deterioration by heat aging by treatment with an organic amine which has a boiling point of at least 75° C. and a melting point of not over 150° C. The amine may be applied to the cellulose fiber in many different ways.

In the case of vulcanized rubber articles reinforced with cellulose fiber in the form of strands, cord, fabric or the like, I may apply the amine to the cellulose fiber reinforcement prior to association thereof with the vulcanizable rubber whereby upon vulcanization there is obtained an article the cellulose reinforcement of which is protected against heat aging. For example in the case of tires, I may immerse the tire fabric in a solution of the selected organic amine (which is sufficiently non-volatile so as not to be lost during subsequent drying or tire manufacturing operations) in a suitable volatile organic solvent, remove the solvent by drying, and incorporate the thus-treated fabric into the finished tire. Treatment of fabric by immersion may be carried out before, simultaneously with, or after latex solutioning. It is now standard practice in the manufacture of tires, to solution the tire cord or fabric with rubber latex. The present invention may conveniently be practiced by adding the organic amine to the latex used in solutioning the tire fabric.

I have found that an equally advantageous method of protecting the cellulose fiber reinforcement of vulcanized rubber articles is to dispose the selected organic amine in diffusable relationship to the article, e. g., by applying the amine to the surface of the rubber, and cause the amine to be transported by diffusion through the rubber into contact with the cellulose fiber reinforcement where it is effective to prevent deterioration by heat aging. This method of treatment is based on the discovery that many of the organic amines having boiling points of at least 75° C. and melting points of not over 150° C. are, at normal or moderately elevated temperatures (such as would prevail during operation of a tire), more or less soluble in, and diffuse through, vulcanized rubber (natural and synthetic). I have found that when such amines are placed in the inner tube or when the amines are placed between the inner tube and the casing they are transported, by diffusion, through the rubber of the inner tube and the casing or through the rubber of the casing into the cellulose fiber reinforcement. One of the advantages which the diffusion method of treatment possesses is that it provides a simple and easily applied method for the continuous treatment of tires while in service by periodical renewal of the amine. For example, by simply placing suitable amounts of the organic amines described herein periodically in the inner tube it is possible to protect the carcass fabric against heat deterioration over an indefinitely prolonged period of time.

The diffusion method outlined in the preceding paragraph is especially advantageous where it is desired to protect the cellulose fiber reinforcement of existing (i. e., already manufactured) rubber articles or where for processing or curing reasons it is deemed undesirable to pre-treat the cellulose fiber reinforcement with the amine. Because of the relatively large volume of the inner tube in a mounted tire and because of the facility with which the organic amines of the present invention can be introduced into it, e. g., by periodic charging through the valve stem, tires are ideally suited for treatment, during service, by the diffusion method.

When using the diffusion method I prefer to employ those organic amines which are liquid at room temperatures, say 20° C., or which are liquid at the temperature encountered in service which, depending on the particular service, may range from 20° C. to 175° C. Thus in the case of those amines which are solids at room temperature, their melting points should be below the temperature at which heat deterioration of the fabric occurs. Theoretically, treatment by diffusion will occur at all temperatures above the melting points of the amines used in accordance with my invention. The rate of treatment will depend primarily upon the rate of solubility in, and diffusion through, the rubber medium or media which separate the amines from the fabric.

I have found that no relationships exist between amines as cellulose heat resisting chemicals and amines as rubber antioxidants, accelerators, etc. My investigations show that although it is true that many amines having rubber antioxidant or accelerator activities are also good cellulose heat resisting chemicals, it is also true that many amines which are not useful as rubber chemicals are valuable cellulose heat resisting compounds. For example, I find that one of the best and most widely known rubber antioxidants, phenyl-beta-naphthylamine, has but little value as a cellulose heat resisting chemical. On the other hand, the otho- and metaphenylenediamines have been found to be excellent cellulose heat resisting amines but are known to be almost without action as rubber accelerators (Memmler, "Science of Rubber" (1934), page 317).

From the foregoing it will be seen that at least three different methods are available for applying the cellulose heat resisting amines of my invention to cellulose cord or fabric used as reinforcement in rubber articles such as tires. These methods are:

1. Treatment of carcass fabric during tire service by diffusion of the amine contained within the inner tube or between the inner tube and the casing.

2. Grey fabric may be treated with the heat resisting amines of my invention followed by the usual latex-dip or creel-to-calender tire manufacturing operations.

3. Where the latex-dip process is employed, the treating amines of my invention may be dissolved or dispersed in the latex bath used to solution of the cord or fabric, thus effecting simultaneous latex solutioning and chemical treatment.

The accompanying drawing shows, in section, a pneumatic tire embodying rayon reinforcing cords in the carcass, which have been treated in accordance with the invention to protect them from gradual, long-term thermal chemical degradation in service. The structure of the tire is otherwise in accordance with the usual practices.

My invention is particularly applicable to the protection of rayon by which I mean regenerated cellulose, commonly of the viscose type. However it is applicable to any cellulose fiber whether native or regenerated. For example I have found that treatment with the organic amines disclosed herein is very effective with such cellulose fibers as cotton and linen. This is indicated by the following Table 1 which reports results of tests wherein rayon tire cord, cotton tire cord and unbleached linen yarn were exposed in a sealed glass tube to the action of m-phenylene diamine for the number of hours indicated at a temperature of 165° C. From Table 1 it will be seen that this particular organic amine used was 70% efficient with rayon, 100% efficient with cotton and 87% efficient with linen.

TABLE 1

*Treatment of rayon and cotton tire cord and unbleached linen yarn with m-phenylene-diamine*

[Strength vs. hours aging at 165° C.]

TREATED

| Hours at 165° C. | Rayon | | Cotton | | Linen | |
|---|---|---|---|---|---|---|
| | Tensile strength [1] | | Tensile strength [1] | | Tensile strength [1] | |
| | Lbs. | Rating | Lbs. | Rating | Lbs. | Rating |
| 0 | 32.5 | 100 | 16.6 | 100 | 15.5 | 100 |
| 7 | | | | | 15.3 | 99 |
| 24 | 27.3 | 84 | 17.1 | 103 | | |
| 30 | | | | | 13.5 | 87 |
| 48 | 23.1 | 71 | 17.2 | 103 | | |
| 72 | 22.6 | 70 | 16.6 | 100 | 13.5 | 87 |

UNTREATED

| 0 | 32.5 | 100 | 16.6 | 100 | 15.5 | 100 |
|---|---|---|---|---|---|---|
| 7 | 12.3 | 33 | 5.0 | 30 | 0 | 0 |
| 24 | 0 | 0 | 0 | 0 | 0 | 0 |

[1] Measured at 70° F. and 60% relative humidity

In the sealed tube tests reported in Table 1 and hereinafter, the organic amine being tested was disposed on a section of yarn saturated therewith and arranged inside the sealed tube parallel to the cellulose fiber cord or yarn being tested; the test assembly is heated at the indicated temperature for the indicated period of time; the transfer of the amine to the cord or yarn undergoing test takes place solely by diffusion through the air in the tube. I have found that such sealed tube tests give an accurate and reliable indication of the effectiveness of the amines in preventing deterioration of cellulose tire cord by the diffusion method described above wherein the organic amine is placed between the tire and the inner tube or within the inner tube.

*Sealed tube diffusion treatment and heat aging of rayon cord*

Viscose rayon tire cord was treated with the 46 amines listed in the following Tables 2, 3 and 4 by the sealed tube diffusion method described above and aged for 7, 30 and 72 hours, respectively, at 165° C. The results are indicated in the tables.

TABLE 2

*Sealed tube diffusion treatment and heat aging hours at 165° C.*

| Amine | Tensile strength [2] | |
|---|---|---|
| | Lbs. | Rating |
| 1. p-Aminodimethylaniline | 31.4 | 104 |
| 2. Triethylenetetramine | 31.4 | 104 |
| 3. Tetraethylenepentamine | 31.1 | 103 |
| 4. Benzylamine | 31.0 | 103 |
| 5. Amylamine | 30.9 | 102 |
| 6. o-Phenylenediamine | 30.3 | 101 |
| 7. Control: Unaged; untreated | 30.1 | 100 |
| 8. Hexylamine | 30.1 | 100 |
| 9. Triethyltrimethylenetriamine | 30.2 | 100 |
| 10. p-Aminodimethylaniline | 29.9 | 100 |
| 11. 2,4-diaminotoluene | 30.1 | 100 |
| 12. m-Phenylenediamine | 29.7 | 99 |
| 13. Cyclohexylamine | 29.8 | 99 |
| 14. Furfurylamine | 29.4 | 98 |
| 15. Mixed amines [1] | 29.5 | 98 |
| 16. Phenylhydrazine | 29.3 | 97 |
| 17. o-Aminodicyclohexyl | 28.9 | 96 |
| 18. Butylamine | 29.1 | 96 |
| 19. p-Toluidine | 28.6 | 95 |
| 20. Aminoethylethanolamine | 28.4 | 94 |
| 21. Diphenylguanidine | 28.3 | 94 |
| 22. m-Aminophenol | 28.1 | 93 |
| 23. m-Toluidine | 27.9 | 93 |
| 24. Tetrahydrofurfurylamine | 27.7 | 92 |
| 25. Piperidine | 27.7 | 92 |
| 26. Aniline | 27.4 | 91 |
| 27. Dibutylamine | 27.5 | 91 |
| 28. 2-amino-2-methyl-1-propanol | 26.8 | 89 |
| 29. 4-Amino-1,3-dimethylbenzene | 26.6 | 88 |
| 30. 2-aminopyridine | 26.5 | 88 |
| 31. o-Toluidine | 25.9 | 86 |
| 32. Diamylamine | 25.7 | 85 |
| 33. Diethylenetriamine | 25.0 | 83 |
| 34. Triethylamine | 24.9 | 82 |
| 35. Tributylamine | 22.0 | 73 |
| 36. 1,3-diaminobutane | 21.4 | 71 |
| 37. p-Aminoacetophenone | 21.6 | 72 |
| 38. N-Methylaniline | 21.2 | 70 |
| 39. 1,3-diaminopropane | 20.2 | 68 |
| 40. p-Aminodiphenyl | 19.7 | 65 |
| 41. Triamylamine | 19.6 | 65 |
| 42. Quinoline | 16.5 | 55 |
| 43. p-Aminobenzophenone | 14.2 | 47 |
| 44. Phenyl-B-naphthylamine | 13.5 | 45 |
| 45. N,N-dimethylaniline | 11.6 | 39 |
| 46. Pyridine | 6.9 | 23 |
| 47. No treatment | 6.4 | 21 |

[1] 20.2% o-phenylenediamine; 32.7% aniline; 47.1% m-phenylenediamine.
[2] Measured at 70° F. and 60% relative humidity.

TABLE 3

*Sealed tube tests of viscose rayon cord aged 30 hours at 165° C.*

| Amine | Tensile strength [2] | |
|---|---|---|
| | Lbs. | Rating |
| 1. Control: Unaged; untreated | 30.1 | 100 |
| 2. p-Aminodimethylaniline | 29.7 | 99 |
| 3. Cyclohexylamine | 26.8 | 96 |
| 4. o-Phenylenediamine | 28.7 | 95 |
| 5. Benzylamine | 28.4 | 94 |
| 6. 2,4-diaminotoluene | 28.1 | 93 |
| 7. Hexylamine | 28.4 | 94 |
| 8. Amylamine | 28.1 | 93 |
| 9. Mixed amines [1] | 28.1 | 93 |
| 10. p-Aminodiethylaniline | 27.7 | 93 |
| 11. Butylamine | 27.5 | 91 |
| 12. Tetrahydrofurfurylamine | 26.8 | 89 |
| 13. Triethyltrimethylenetriamine | 26.5 | 88 |
| 14. Phenylhydrazine | 26.4 | 88 |
| 15. Tetraethylenepentamine | 26.2 | 87 |
| 16. Diphenylguanidine | 26.1 | 87 |
| 17. Triethylenetetramine | 25.9 | 86 |
| 18. m-Phenylenediamine | 26.2 | 87 |
| 19. o-Aminodicyclohexyl | 26.2 | 87 |
| 20. Piperidine | 25.9 | 86 |
| 21. Furfurylamine | 25.4 | 85 |
| 22. 2-aminopyridine | 24.7 | 82 |
| 23. Diethylenetriamine | 24.6 | 82 |
| 24. p-Toluidine | 25.0 | 83 |
| 25. 2-amino-2-methyl-1-propanol | 24.7 | 82 |
| 26. m-Toluidine | 23.7 | 80 |

TABLE 3.—Continued

| Amine | Tensile strength [2] | |
|---|---|---|
| | Lbs. | Rating |
| 27. Aniline | 23.3 | 78 |
| 28. m-Aminophenol | 22.2 | 74 |
| 29. Dibutylamine | 20.1 | 67 |
| 30. Aminoethylethanolamine | 19.9 | 67 |
| 31. 1,3-diaminobutane | 19.2 | 64 |
| 32. 1,3-diaminopropane | 18.9 | 63 |
| 33. 4-amino-1,3-dimethylbenzene | 18.0 | 61 |
| 34. o-Toluidine | 16.6 | 56 |
| 35. Diamylamine | 14.7 | 49 |
| 36. N-methylaniline | 6.8 | 22 |
| 37. Triethylamine | 4.0 | 13 |
| 38. No treatment | 0 | 0 |
| 39. Tributylamine | 0 | 0 |
| 40. Triamylamine | 0 | 0 |
| 41. Quinoline | 0 | 0 |
| 42. Pyridine | 0 | 0 |
| 43. p-Aminobenzophenone | 0 | 0 |
| 44. p-Aminoacetophenone | 0 | 0 |
| 45. p-Aminodiphenyl | 0 | 0 |
| 46. N,N-dimethylaniline | 0 | 0 |
| 47. Phenyl-B-naphthylamine | 0 | 0 |

[1] 20.2% o-phenylenediamine; 32.7% aniline; 47.1% m-phenylenediamine.
[2] Measured at 70° F. and 60% relative humidity.

TABLE 4

*Sealed tube tests of viscose rayon cord aged 72 hours at 165° C.*

| Amine | Tensile strength [3] | | Rubber swelling, percent in 96 hrs. | Properties of amines | |
|---|---|---|---|---|---|
| | Lbs. | Rating | | M.P. °C. | B.P. °C. |
| 1. Control: Untreated; unaged | 30.1 | 100 | | | |
| 2. Mixed amines [2] | 28.8 | 96 | | 1q | 257 |
| 3. o-Phenylenediamine | 28.4 | 94 | | 103 | 257 |
| 4. p-Aminodimethylaniline | 27.5 | 91 | 11.8 | 41 | 262 |
| 5. Cyclohexylamine | 26.7 | 89 | | 1q | 134 |
| 6. 2,4-diaminotoluene | 26.6 | 88 | | 99 | 283 |
| 7. Amylamine | 26.5 | 88 | 159.0 | 1q | 103 |
| 8. Hexylamine | 26.4 | 88 | 325.0 | 1q | 126 |
| 9. Benzylamine | 26.2 | 87 | 49.8 | 1q | 184 |
| 10. Mixed amines [1] | 25.8 | 86 | 2.8 | 1q | |
| 11. Butylamine | 26.0 | 86 | 20.40 | 1q | 78 |
| 12. Triethyltrimethylenetriamine | 25.4 | 84 | 1.3 | 1q | |
| 13. m-Phenylenediamine | 25.1 | 83 | | 63 | 284 |
| 14. p-Aminodiethylaniline | 25.2 | 83 | 15.0 | 15.0 | 260 |
| 15. 2-amino-2-methyl-1-propanol | 24.2 | 80 | 1.4 | 1q | |
| 16. Tetrahydrofurfurylamine | 23.3 | 77 | | 1q | |
| 17. p-Toluidine | 22.0 | 73 | | 44 | 200 |
| 18. o-Aminodicyclohexyl | 22.0 | 73 | 282.0 | 1q | |
| 19. Phenylhydrazine | 21.3 | 71 | | 19.6 | 243 |
| 20. Furfurylamine | 21.2 | 70 | | 1q | |
| 21. Piperdine | 20.9 | 70 | 372.0 | 1q | |
| 22. m-Aminophenol | 20.6 | 68 | | 122 | |
| 23. Diethylenetriamine | 20.6 | 68 | 9.8 | 1q | 185 |
| 24. Aminoethylethanolamine | 19.8 | 67 | 1.4 | 1q | 232 |
| 25. Diphenylguanidine | 20.3 | 67 | | 147 | 170 |
| 26. m-Toluidine | 19.5 | 65 | 23.0 | 1q | 203 |
| 27. Aniline | 19.6 | 65 | 13.2 | 1q | 184 |
| 28. Triethylenetetramine | 19.2 | 64 | 2.7 | 1q | 260 |
| 29. Tetraethylenepentamine | 19.3 | 64 | 2.5 | 1q | 340 |
| 30. 1,3-diaminopropane | 18.6 | 62 | 29.0 | 1q | 133 |
| 31. 1,3-diaminobutane | 18.4 | 61 | 46.0 | 1q | 143 |
| 32. o-Toluidine | 7.3 | 24 | 25.1 | 1q | 200 |
| 33. Dibutylamine | 6.6 | 22 | 287.0 | 1q | 159 |
| 34. 4-amino-1,3-dimethylbenzene | 3.3 | 11 | 57.0 | 1q | 213 |
| 35. 2-aminopyridine | 3.4 | 11 | | 56 | 204 |
| 36. No treatment | 0 | 0 | | | |
| 37. p-Aminodiphenyl | 0 | 0 | | 50 | 302 |
| 38. p-Aminoacetophenone | 0 | 0 | | 104 | |
| 39. p-Aminobenzophenone | 0 | 0 | | 124 | |
| 40. Pyridine | 0 | 0 | 83.0 | 1q | 115 |
| 41. Quinoline | 0 | 0 | 93.0 | 1q | 237 |
| 42. Diamylamine | 0 | 0 | | 1q | 202 |
| 43. Triamylamine | 0 | 0 | | 1q | 240 |
| 44. Tributylamine | 0 | 0 | 261.0 | 1q | 217 |
| 45. Triethylamine | 0 | 0 | 285.0 | 1q | 89 |
| 46. N-methylaniline | 0 | 0 | | 1q | 196 |
| 47. N,N-dimethylaniline | 0 | 0 | | 1q | 193 |
| 48. Phenyl-B-naphthylamine | 0 | 0 | | 107 | 396 |

[1] 20.2% o-phenylenediamine; 32.7% aniline; 47.1% m-phenylenediamine.
[2] Equal parts of o-phenylenediamine, p-aminodimethylaniline, 2,4-diaminotoluene, amylamine, benzylamine, m-phenylenediamine and p-aminodiethylaniline.
[3] Measured at 70° F. and 60% relative humidity.

In view of the high degree of correlation which I have found to exist between sealed tube tests and whole tire heat aging tests wherein the amine is placed either in the inner tuber or between the tube and the casing and wherein the mounted tire is rotated in a mechanically ventilated heated oven, the heat aging efficiencies of the amines under whole tire aging conditions would be expected to be of substantially the same order of magnitude as those obtained under sealed tube conditions, provided of course that the amine meets the minimum rubber solubility and diffusion requirements.

Table 2 shows that under the mild 7 hours aging conditions all of the organic amines tabulated have rayon aging efficiencies to a greater or lesser extent ranging from 23 to 104%. Tables 3 and 4 show that upon increasing the severity of the aging conditions by extending the aging period to 30 and 72 hours, respectively, the amines having less efficient heat resisting efficiency are successively eliminated. Thirty-six of the original forty-five amines survived the 30 hour test and thirty-four survived the 72 hour test. The amines which are eliminated under the most severe test conditions are for the most part secondary and tertiary amines. All of the compounds listed in Table 4 as having heat resisting efficiencies of 60% or more are primary amines except diphenylguanidine, triethyltrimethylenetriamine and piperidine which are secondary amines.

In the practice of my invention I prefer to employ those amines which have a heat resisting efficiency of at least 60% when tested for 72 hours at 165° C. with viscose rayon by the sealed tube test as reported in Table 4. Still more preferably I use those amines which have an efficiency of 80% or more in this test. I prefer to use the primary amines. When using the diffusion method I also prefer to use those amines which are soluble in vulcanized rubber, i. e., exhibit a swelling action on vulcanized rubber (heavy service tire tube stock) of at least 1.0% when tested for 96 hours at 70° F. by the standard ASTM method.

In general, those amines are most effective which have a pH of 7 or more. In all instances heat resisting efficiencies fall sharply in passing from primary (aniline, butylamine, amylamine) to secondary (N-methyl aniline, dibutylamine, diamylamine) to tertiary amines (N,N-dimethyl aniline, tributylamine, triamylamine). The effectiveness of the toluidines diminishes in passing from the para- through the meta- to the ortho-isomers. Although the polyethylene amines have practically identical heat resisting efficiencies after 72 hours aging at 165° C., the tri- and tetra-compounds are somewhat more effective than the di- compound during the early period of aging.

*Whole tire-aging treatment by diffusion from within tube and from between tube and casing*

Mounted and inflated tires were aged by placing in a heated oven for 72 hours. The oven was mechanically ventilated so that there was good circulation of air through the oven around the tires. The tires were rotated at 35 R. P. M. throughout the aging. Two methods of placement of the amine were employed. In some of the tests the amines were placed within the tube and in others they were placed between the tube and the casing. The tires were of the size known in the industry as 4.00–8/6 and were constructed with viscose rayon cord. Although all tires were aged for 72 hours, one group was aged under stepped-up temperature conditions, i. e., 24 hours at 150°, 24 hours at 160° and 24 hours at 170° C. and the other group at a constant temperature of 165° C. The results of the testing are given in the following Table 5 which gives the tensile strength of the aged carcasses measured at 70° F. and 60% relative humidity, the bone-dry cord strength and the carcass nitrogen content. The residual cord strength measures the extent of permanent heat deterioration of the fabric. Carcass nitrogen content is a direct measure of the extent of material transfer of the amines from the inner tube to the carcass.

TABLE 5

*Whole tire (rayon cord) aging tests*

[Cord: 2200 denier, 2 ply.]

| Amt. (gms) | Chemical in tube | Heat aged | | Cord tensile strength at 70° F. and 60% R. H. | | Bone-dry cord strength | | Carcass N₂, percent |
|---|---|---|---|---|---|---|---|---|
| | | Temp., ° C. | Period, hours | Lbs. | Rating | Lbs. | Rating | |
| ------ | New tire | (*) | ------ | 30.3 | ------ | 35.0 | ------ | 0.22 |
| ------ | None | (¹) | 72 | 15.0 | 100 | ------ | ------ | ------ |
| 100 | m-Phenylenediamine | (¹) | 72 | 25.0 | 167 | ------ | ------ | ------ |
| 80 | m-Phenylenediamine ² | (¹) | 72 | 24.6 | 164 | ------ | ------ | ------ |
| 80 | o-Phenylenediamine ² | (¹) | 72 | 23.1 | 154 | ------ | ------ | ------ |
| 93 | Aniline | (¹) | 72 | 22.7 | 151 | ------ | ------ | ------ |
| 125 | Ethanolamine | (¹) | 72 | 18.4 | 123 | ------ | ------ | ------ |
| ------ | None | 165 | 72 | 12.2 | 100 | 21.2 | 100 | 0.24 |
| 225 | Amine mixture ³ | 165 | 72 | 25.2 | 208 | 31.5 | 149 | 1.22 |
| 83 | Amine mixture ⁴ | 165 | 72 | 23.3 | 191 | 31.8 | 150 | 0.67 |
| 225 | Amine mixture ⁵ | 165 | 72 | 23.2 | 190 | 32.6 | 154 | 1.12 |
| 80 | Triethyltrimethylenetriamine | 165 | 72 | 16.3 | 133 | 24.7 | 116 | 0.84 |
| 100 | 2-amino-2-methyl-1-propanol | 165 | 72 | 21.5 | 176 | ------ | ------ | ------ |

¹ 24 Hours at 150° C.; 24 hours at 160° C.; 24 hours at 170° C.
² Placed between tube and casing (in other tests in this table wherein amines were used they were placed in the tube).
³ 30% o-phenylenediamine and 70% m-phenylenediamine.
⁴ 22% aniline and 78% m-phenylenediamine.
⁵ 20.2% o-phenylenediamine; 32.7% aniline and 47.1% m-phenylenediamine.
*Not aged.

The limited solubility of ethanolamine and of triethyltrimethylenetriamine in vulcanized rubber practically excludes them from application to tires by diffusion methods. From the data for the stepped-up aging tests reported in Table 5 it will be seen that the primary aromatic amines, namely ortho- and meta-phenylene-diamine and aniline, effect rayon heat aging improvements ranging from 51 to 67%. Since the phenylenediamines, which are among the best amines found, have the disadvantage of being solid and hence difficult to introduce into the tube through the small opening in the valve stem, compositions of these diamines with aniline were prepared which were liquid at room or slightly above room temperature. The mixture of 30% o- and 70% m-phenylenediamine is the minimum melting point mixture. The pure ortho melts at 103° C., the meta at 63° C. and their minimum melting mixture at 48° C. The composition comprising 78% m-phenylenediamine and 22% aniline is a solution of m-phenylenediamine in just enough aniline to keep the mixture liquid at room temperatures. The ternary composition comprising 20.2% o-phenylenediamine, 47.1% m-phenylenediamine and 32.7% aniline is the minimum melting point mixture of o- and m-phenylenediamine referred to above to which sufficient aniline has been added to keep the composition liquid at about 20° C. Use of liquid compositions containing one or more phenylenediamine and another effective normally liquid amine such as aniline in sufficient amount to keep the mixture liquid at room temperature is preferred. Instead of aniline I may employ with the phenylenediamine other effective amines which are capable of yielding a mixture which is liquid at room temperature, examples being benzylamine, p-aminodimethylaniline, p-aminodiethylaniline, 1,3-diaminopropane and 1,3-diaminobutane. Such other amines have the advantage over aniline of diluting to a somewhat less extent the superior heat-resisting properties of the phenylenediamines.

*Whole tire heat aging; 4.00-8/6 two-ply tire mounted and inflated cord treatment by diffusion of amine mixture from tube. Aging for 72 hours at temperatures ranging from 125 to 175 C.*

Mounted two-ply tires of the type known as 4.00-8/6 and made with viscose rayon cord (2200 denier) were aged, with an amine mixture in the tube, at elevated temperatures ranging from 125 to 175° C. for 72 hours. Untreated tires were included for comparison. The amine mixture used had a composition consisting of 20.2% o-phenylenediamine, 32.7% aniline and 47.1% m-phenylenediamine. The tires were inflated to 40 pounds pressure. As in the other whole tire aging tests, the aging was carried out in a heated mechanically ventilated oven with rotation of the mounted tires. The cord strength of the treated and untreated tires were measured at 70° F. and 60% relative humidity. The results were as follows:

TABLE 6

| Temp., ° C. | Tube charge (gms.) | Cord strength untreated | | Tube charge (gms.) | Cord strength treated | |
| --- | --- | --- | --- | --- | --- | --- |
| | | Lbs. | Rating | | Lbs. | Rating |
| Not aged | | 30.3 | 100 | | 30.3 | 100 |
| 125 | None | 27.9 | 92 | 225 | 28.7 | 95 |
| 135 | do | 25.9 | 86 | 225 | 28.5 | 94 |
| 145 | do | 24.2 | 80 | 225 | 26.5 | 87 |
| 165 | do | 12.2 | 40 | 225 | 23.2 | 77 |
| 175 | do | 7.1 | 23 | 225 | 21.8 | 72 |

The results set forth in Table 6 show that the mixture of primary aromatic amines used markedly improves the heat aging resistance of the rayon carcass fabric when aged for 72 hours at 125°—175° C. It will be noted that the treatment is effective over the complete range of temperatures studied and first appears at the temperature at which the untreated tire shows incipient aging. The most significant effect of the treatment is that it greatly retards heat aging above the temperature of 145° C. which is critical in heat aging of cellulose fibers. Above 145° the untreated carcass fabric lost strength at the rate of 0.85 pound per degree increase in temperature. When treated, the loss was only 0.17 pound per degree, representing a 70% reduction in aging rate.

The amount of the amine used in practicing my invention may vary widely depending upon many factors including the particular amine used, the extent of protection desired, the mode of application, etc. Any amount, however small, will give some protection, but it is preferred to use at least the minimum required to give maximum protection. This minimum amount is critical and is specific for each amine and mode of application thereof. Usually I employ the amine in an amount ranging from 5% to 15% by weight based on the cellulose fiber being protected.

An indication of the effect of varying amounts of the amine when using the diffusion method of application may be had from the following data in Table 7 which summarizes the results of whole tire heat aging tests with varying amounts of the mixture of 20.2% o-phenylenediamine, 32.7% aniline and 47.1% m-phenylenediamine placed in the inner tube. A 4.00-8/6 two-ply rayon cord (2200 denier) tire mounted and inflated to 40 pounds pressure was rotated in the mechanically ventilated oven as before. The tire was aged 72 hours at 165° C.

TABLE 7

| Amount (gms.) of amine in inner tube | Cord strength [1] | | Percent change in tire weight | Carcass nitrogen content, percent |
| --- | --- | --- | --- | --- |
| | Lbs. | Rating | | |
| Not aged | 30.3 | 100 | | |
| 0 | 12.2 | 40 | −2.34 | 0.28 |
| 35 | 18.1 | 60 | −1.87 | 0.55 |
| 70 | 22.4 | 74 | −1.42 | 0.84 |
| 150 | 23.9 | 79 | −0.44 | 0.87 |
| 225 | 23.2 | 77 | 0.86 | 1.07 |

[1] Measured at 70° F. and 60% relative humidity.

A plot of the data in Table 7, which is specific for the particular amine mixture employed and the particular mode of application, shows that about 100 grams (2.5% of tire weight) of the amine mixture is required to give the maximum protection. Since pneumatic rubber tires generally comprise about 20% of cellulose fiber reinforcement the minimum amount corresponds approximately to five times 2.5% or 12.5% of the weight of the cellulose. Other factors being equal, the efficiency of a given heat resisting amine is determined by its chemical properties and not by the amount present in excess of that required to meet existing fabric heat aging requirements. Any excess however is available to give protection continuously during the period following the charging, until the next charging.

Table 7 also shows that under 72 hour-165° C. heat aging conditions, the tire weight increases linearly with increasing amounts of the amines in the tube which is direct evidence of material transfer of the amines from the tube to the carcass by diffusion processes. Table 7 also shows the results of chemical analyses for nitrogen content of the carcass as a function of the amount of the amine mixture in the tube.

In practical application, an essential requirement of treatment by diffusion of amines from the inner tube is that treatment of the carcass should precede or coincide with incipient fabric aging conditions. The phenylenediamines, aniline and many other primary aromatic and aliphatic amines meet this requirement. The data reported in Table 5 above indicates that triethyltrimethylenetriamine and ethanolamine are among the compounds which when placed in the inner tube permit aging of the carcass fabric to precede treatment. Presumably this is due to their relatively low solubility in rubber.

A 4.00-8/6 two-ply tire mounted and inflated was aged 72 hours at 165° C. by the whole tire aging method with diffusion of a mixture of 32.7% aniline, 47.1% m-phenylenediamine and 20.2% o-phenylenediamine from the tube. The amount of the amine mixture placed in the tube was 225 grams. The tire was made with rayon cord (2200 denier). Analyses of two major carcass components, fabric and rubber, show that after the 72 hours aging, 80% of the total carcass nitrogen due to the treating amine is located in the fabric and the remaining 20% is in the rubber. Further examination of the fabric revealed that its nitrogen behaved as though it were in chemical combination with the cellulose or its thermal degradation products, i. e., as though the amine had been fixed by the cellulose under fabric heat aging conditions. The nitrogen could not be removed for example by such drastic chemical methods as strong acid hydrolysis or acetolysis. It is, in fact, so firmly bound that it appeared in the regenerate after xanthation. Thus, after heat aging in the presence of the organic amines of the present invention, the fabric appears to be, to an appreciable extent, an unidentified derivative of cellulose or its thermal degradation products composed of the elements carbon, hydrogen, oxygen and nitrogen.

In practicing that aspect of my invention wherein the amine is placed within the tire (i. e., within the tube or between the casing and the tube, e. g., by application to the inside of the casing) and caused to be transported into the rubber of the tube and casing, I prefer to use primary amines such as primary alkyl amines such as butylamine, amylamine, etc., alicyclic primary amines such as cyclohexylamine, o-aminodicyclohexyl, etc., heterocyclic primary amines such as tetrahydrofurfurylamine and furfurylamine, primary aralkyl amines such as benzylamine, and primary aromatic amines such as aniline, toluidines, toluylenediamines, phenylenediamines, etc., or secondary heterocyclic amines, the nitrogen atom of the secondary amino group of which is heterocyclic such as piperidine, morpholine, etc. In the case of the primary aromatic amines I prefer to use those which have on the benzene ring at least one primary amino group both ring positions ortho to which are unsubstituted (substitution with primary amino groups being expected); thus p-toluidine and m-toluidine give good results whereas o-toluidine gives poorer results. Similarly p-aminodimethylaniline, p-aminodiethylaniline and 2,4-diaminotoluene which have one amino group which is unsubstituted on both sides give good results while 4-amino-1,3-dimethylbenzene gives poorer results. Furthermore for best results the primary aromatic amines should be free from ring substitution with large groups (containing two or more carbon atoms) bonded to the ring through carbon such as phenyl, acyl, etc. Thus p-aminodiphenyl, p-aminoacetophenone and p-aminobenzophenone give results much inferior to aniline. A further limitation on the preferred amines for application by the diffusion method is that they show substantial solubility in vulcanized rubber, i. e., at least 1.0% swelling action on vulcanized rubber as tested for 96 hours at 70° F. by the ASTM method. Such amines as triethanolamine, diethanolamine show a swelling action of less than 1.0% as measured by this test and will not migrate as desired.

When practicing that mode of application of my invention to finished tires which involves disposing a suitable amount of the amine preferably selected as described in the preceding paragraph within the tire and causing diffusion thereof through the rubber into protective contact with the cellulose reinforcement, the amount of the amine employed is preferably at least 1% and more desirably at least 2.5% of the tire weight. By "within the tire" I mean either within the inner tube or between the casing and the tube. The amine may be painted on the inside of the casing prior to placement in service. For example, the amine may be adsorbed onto carbon black and this compounded with cellulose acetate and a suitable plasticizer or other vehicle to a brushing consistency and the resulting material painted on the inside of the casing or on the outside of the inner tube. Alternatively, carbon black, or other solid adsorptive carrier, carrying the adsorbed amine may be compounded with rubber latex and this material painted on the outside of the tube or on the interior of the casing. Still further, the adsorbent-amine composition may be dusted between the casing and tube.

I have found that an especially satisfactory method of applying the amine within the tire is to adsorb the amine onto an adsorbent carrier such as carbon black and to place the resulting solid material within the inner tube during manufacture thereof. In this way the existence of a pool or body of liquid amine within the inner tube is avoided and at the same time the carrier provides an enormous surface for diffusion of the amine. The amine content of the adsorbent can be replenished by periodic charging of amine alone through the valve stem.

The following Table 8 gives the result of whole tire aging tests wherein 100 grams of the amines specified were placed inside the inner tube, the entire mounted tire assembly being aged (with rotation) for the time and at the temperature indicated. As indicated, the amine was carried on acetylene carbon black used in an amount equal to one-half the weight of the amine. The results clearly indicate the high degree of protection of the rayon cord of the tire by this method of application.

Instead of using acetylene carbon black as the solid adsorptive carrier for the amine or mixture of amines, I may use any other solid adsorptive carrier which is capable of adsorbing a substantial amount (preferably at least 50% and still more preferably at least 100% of the weight of the amine based on the weight of the carrier) of the amine and of giving up such amine gradually for diffusion into the fabric of the tire. Examples are diatomaceous earth, activated carbon such as activated charcoal, activated alumina, silica gel, etc.

TABLE 8

*Whole tire (rayon cord) aging tests*

[Cord: 1650 denier, 2 ply.]

| Amount [1] (grams) | Amine in tube | Heat aged | | Cord tensile strength [3] | |
|---|---|---|---|---|---|
| | | ° C. | Hrs. | Lbs. | Ratings |
| | None—New tire | | | 20.3 | 100 | |
| | None | 165 | 72 | 7.8 | 39 | 100 |
| 100 | Amine mixture [2] | 165 | 72 | 15.7 | 77 | 201 |
| 100 | m-Toluylenediamine | 165 | 72 | 17.9 | 88 | 230 |
| 100 | Cyclohexylamine | 165 | 72 | 16.0 | 79 | 205 |

[1] With 50 grams of acetylene carbon black.
[2] 20.2% o-phenylenediamine, 32.7% aniline, and 47.1% m-phenylenediamine.
[3] Measured at 70° F. and 60% relative humidity.

Table 9 illustrates the results that can be obtained by the use of the amines of the present invention dissolved in rubber latex suspension used for solutioning the tire cord prior to building of the tire therefrom. In the experiments reported in Table 9, two different amounts of m-phenylenediamine were dissolved in the rubber latex. The results were as follows:

TABLE 9

*Whole tire heat aging*

[Cord: Rayon; 2,200 denier, 2 ply.]

| Percent m-phenylenediamine in latex | On fabric | Aged at 165° C. hrs. | Cord strength [1] | |
|---|---|---|---|---|
| | | | Lbs. | Ratings |
| None | None | None | 30.3 | 100 | |
| Do | None | 72 | 12.2 | 40 | 100 |
| 4.4 | 2.6 | 72 | 22.9 | 76 | 188 |
| 9.6 | 5.0 | 72 | 25.2 | 83 | 207 |

[1] Measured at 70° F. and 60% relative humidity.

When the amine is applied simultaneously with solutioning of the fabric with latex, the latex used may be either ordinary rubber latex of the type customarily used for solutioning tire cord (e. g., as disclosed in Hopkinson 1,424,020) or an aqueous mixture of natural or synthetic rubber latex.

The following Table 10 illustrates the results which can be obtained by the application of the amines of the present invention, specifically m-phenylenediamine, to the grey rayon fabric prior to solutioning thereof with latex and building into a finished tire.

TABLE 10

*Whole tire heat aging*

[Cord: Rayon; 2200 denier, 2 ply.]

| m-Phenylenediamine on fabric, percent | Aged at 165° C., hrs. | Cord strength [1] | |
|---|---|---|---|
| | | Lbs. | Ratings |
| None | None | 30.3 | 100 | |
| Do | 72 | 12.2 | 40 | 100 |
| 4.1 | 72 | 21.9 | 72 | 179 |
| 6.0 | 72 | 23.1 | 76 | 189 |
| 8.6 | 72 | 25.6 | 84 | 210 |

[1] Measured at 70° F. and 60% relative humidity.

As indicated above, certain of the heat-resisting amines are particularly applicable by certain of the methods of application described above. Thus, pre-vulcanization methods such as those involving application of the amine to the fabric either prior to or simultaneously with latex solutioning, require the use of amines which are more or less permanent. That is to say, they should not be lost by volatilization during any drying operation which may follow the treatment. They must not, for example, be lost during the web fabric drying or calendering operations. Furthermore, they must not irreparably disturb the normal curing characteristics of the rubber stocks associated therewith and must not create a "blowing" problem. Post-vulcanization methods, e. g., the diffusion method, require the use of amines which have the necessary physical properties, rubber solubility, etc., to effect satisfactory treatment of the carcass fabric over widely varying tire operation temperature. Those skilled in the art will be readily able to select suitable amines for particular methods of application in carrying out the present invention.

From the foregoing description, it will be seen that the present invention provides a simple, easily applied and economical method of protecting cellulose fiber, especially cellulose cord fabric in pneumatic rubber tires, and particularly regenerated cellulose or rayon tire fabric, against deterioration by the prolonged action of heat.

No claim is made that the method of the invention renders the cellulose fiber flame resistant or fireproof, and when reference is made to imparting resistance to heat deterioration, it is merely intended to imply that the cellulose is substantially protected against deterioration at temperatures below the ignition temperature of the cellulose.

Having thus described my invention, what I claim and desire to protect by Letters Patent is:

1. A method of protecting the cellulose fiber reinforcement of a pneumatic vulcanized rubber tire containing a rubber air-retaining envelope against deterioration by heat aging while in service which comprises disposing within the said rubber air-retaining envelope a solid adsorptive carrier impregnated with ortho-phenylenediamine, whereby said ortho-phenylenediamine is transported by diffusion through the rubber into contact with the cellulose fiber reinforcement of said tire and to thereby protect said cellulose fiber reinforcement against heat aging.

2. A method of protecting the cellulose fiber reinforcement of a pneumatic vulcanized rubber tire containing a rubber air-retaining envelope against deterioration by heat aging while in service which comprises disposing within the said rubber air-retaining envelope a solid adsorptive carrier impregnated with meta-phenylenediamine, whereby said meta-phenylenediamine is transported by diffusion through the rubber into contact with the cellulose fiber reinforcement of said tire and to thereby protect said cellulose fiber reinforcement against heat aging.

3. A method of protecting the regenerated cellulose fiber reinforcement of a pneumatic vulcanized rubber tire containing a rubber air-retaining envelope against deterioration by heat aging while in service which comprises disposing within the said rubber air-retaining envelope a solid adsorptive carrier impregnated with a primary organic amine having a boiling point within the range of from 75° C. to 340° C., a melting point of not over 150° C., and a swelling action on vulcanized rubber of at least 1.0% when tested for 96 hours at 70° F. by the standard ASTM method, whereby said amine is transported by diffusion through the rubber into contact with the cellulose fiber reinforcement of said tire thereby protecting said cellulose fiber reinforcement against heat aging.

HOWARD M. BUCKWALTER.

References Cited in the file of this patent

UNITED STATES PATENTS

| Number | Name | Date |
|---|---|---|
| 1,725,564 | Calcutt et al. | Aug. 20, 1929 |
| 1,867,035 | Stocker | July 12, 1932 |
| 2,050,196 | Sebrell | Aug. 4, 1936 |
| 2,148,862 | Kern | Feb. 28, 1939 |
| 2,211,948 | Hershberger | Aug. 20, 1940 |
| 2,256,153 | Riehl | Sept. 16, 1941 |
| 2,256,194 | Crawford | Sept. 16, 1941 |
| 2,263,305 | Lessig et al. | Nov. 18, 1941 |
| 2,315,857 | Howland | Apr. 6, 1943 |
| 2,363,717 | Wolk | Nov. 28, 1944 |
| 2,392,881 | Ritschoff et al. | Jan. 15, 1946 |

FOREIGN PATENTS

| Number | Country | Date |
|---|---|---|
| 522,568 | Great Britain | June 21, 1940 |